United States Patent [19]
Hisatsu

[11] 3,761,931
[45] Sept. 25, 1973

[54] AUTOMATIC DIRECTION FINDERS
[75] Inventor: Chosaku Hisatsu, Chigasaki, Japan
[73] Assignee: Nippon Oceanics Institute, Ltd., Fujisawa City, Japan
[22] Filed: Sept. 23, 1970
[21] Appl. No.: 74,548

[52] U.S. Cl. ............................. 343/121, 343/117 R
[51] Int. Cl. .............................................. G01s 3/14
[58] Field of Search ...................... 343/117 R, 121

[56] References Cited
UNITED STATES PATENTS

| | | | |
|---|---|---|---|
| 2,356,922 | 8/1944 | Eltgroth | 343/121 X |
| 3,005,605 | 10/1961 | MacCready | 343/121 UX |
| 2,840,814 | 6/1958 | Hemphill et al. | 343/121 |

Primary Examiner—T. H. Tubbesing
Attorney—Chittick, Pfund, Birch, Samuels and Gauthier

[57] ABSTRACT

In a wireless direction finder there are provided a loop antenna and a vertical antenna, a circuit means for effecting a balanced modulation of one of the output signals of these antennas with a given modulation frequency and for combining the modulated signal with the other of the antenna output signals, a detector circuit for detecting the output signal from the circuit means, a phase detector circuit to effect phase detection of the output signal from the detector circuit in accordance with the modulation frequency, a DC motor for rotating the loop antenna, a DC source having a mid-point connected to one terminal of the DC motor, a pair of control transistors respectively connected between the other terminal of the DC motor and opposite poles of the DC source, and a pair of transistors controlling the ON and OFF operations of the control transistors in accordance with the output of the phase detector circuit.

2 Claims, 2 Drawing Figures

Patented Sept. 25, 1973

3,761,931

INVENTOR.
CHOUSAKU HISATSU

AUTOMATIC DIRECTION FINDERS

BACKGROUND OF THE INVENTION

This invention relates to improvements of a direction finder for automatically determining the direction of arrival of incoming electromagnetic waves.

In one type of the wireless direction finder, a loop antenna is rotated by an electric motor, which is controlled to rotate in the forward or reverse direction to bring the loop antenna to a direction in which the intensity of the received field is minimum. The driving motor for use in the direction finder of this type should be reversible and a two phase motor has been used for this purpose. However, two phase motors have small torque, large size and are expensive. Moreover, to stabilize the operation of the loop antenna, it is necessary to include a stabilizing circuit in circuit with the motor. While a bridge T circuit and the like are used for this purpose, such circuits are required to have accurate constants, thus complicating the circuit construction and increasing the cost. Where transistor amplifying circuits are used in the driving circuit for the motor, unequal amplification factors of transistors results in the variation of the gain. As is well known in the art, in the automatic direction finder too large a gain results in unstable operation whereas too small a gain results in the delay in indication. Accordingly, it is especially important to stabilize the gain.

SUMMARY OF THE INVENTION

It is an object of this invention to provide a new and improved wireless direction finder of simplified circuit construction.

Another object of this invention is to provide a novel wireless direction finder utilizing a DC motor and transistorized control circuit therefor.

According to this invention there is provided a wireless direction finder comprising a loop antenna and a vertical antenna for receiving incoming electromagnetic waves, circuit means for effecting a balanced modulation of one of the output signals from the loop antenna and vertical antenna with a given modulation frequency and for combining the modulated signal with the other of the output signals, a detector circuit for detecting the output signal from the circuit means, a phase detector circuit to effect phase detection of the output signal from the detector circuit in accordance with the modulation frequency, a DC motor for rotating the loop antenna, a DC source having a mid-point connected to one terminal of the motor, a pair of control transistors respectively connected between the other terminal of the motor and opposite poles of the DC source, and a pair of transistors controlling the ON and OFF operations of the control transistors in accordance with the output of the phase detector circuit.

Control circuits for controlling the forward and reverse rotations of the motor are constructed symmetrically thus simplifying the circuit construction.

BRIEF DESCRIPTION OF THE DRAWINGS

The invention can be more fully understood from the following detailed description when taken in conjunction with the accompanying drawings in which.

DESCRIPTION OF THE PREFERRED EMBODIMENTS

Figure 1:
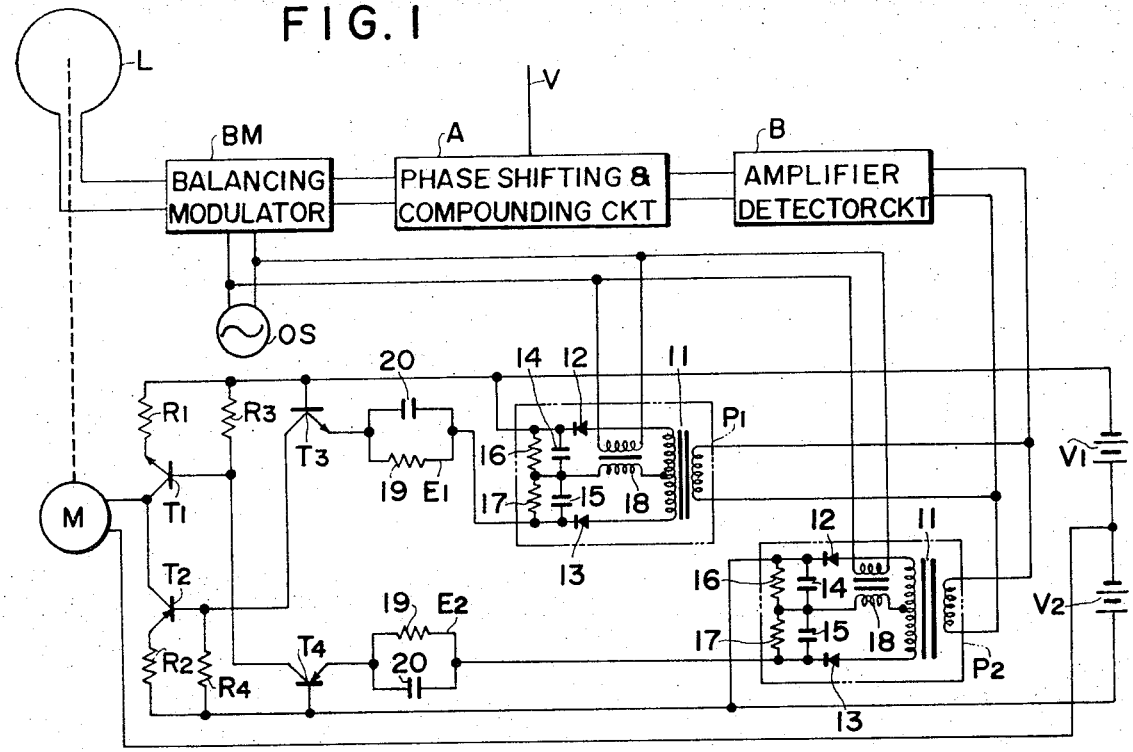
FIG. 1 is a connection diagram, partly in block form, of one embodiment of the novel direction finder

The embodiment of the novel direction finder illustrated in FIG. 1 comprises a loop antenna L driven by a DC motor M as shown by a dotted line and connected to a balancing modulator BM which is energized by a source of modulation frequency OS. The output of the balancing modulator BM is coupled to a phase shifting and compounding circuit A which is also connected to receive an input from a sense or polarity determining vertical antenna V. The output from phase shifting and compounding circuit A is supplied to the primary windings of input transformers 11 of phase detectors $P_1$ and $P_2$ via an amplifier-detector circuit B. Other input windings of phase detectors $P_1$ and $P_2$ are connected to modulation frequency source OS. Opposite terminals of the secondary windings of the input transformer 11 of the phase detectors $P_1$ and $P_2$ are connected across serially connected capacitors 14 and 15 via diodes 12 and 13, and resistors 16 and 17 are connected in series across capacitors 14 and 15. Junctures between resistors 16 and 17 and capacitors 14 and 15 are connected to the midpoint of the secondary windings of input transformers 11 through secondary windings of input transformers 18. The upper output terminals of phase detector circuits $P_1$ and $P_2$ are connected to the negative pole of a battery $V_1$ and to the positive pole of a battery $V_2$, respectively, and the lower output terminals are connected to emitter electrodes of a NPN type transistor $T_3$ and a PNP type transistor $T_4$, respectively, through stabilizing circuits $E_1$ and $E_2$, each consisting of parallel connected resistor 19 and a capacitor 20. Base electrodes of these transistors are connected to the negative pole of battery $V_1$ and to the positive pole of battery $V_2$, respectively. The collector electrodes of transistors $T_3$ and $T_4$ are connected to base electrodes of a PNP type transistor $T_2$ and of a NPN type transistor $T_1$, respectively. These collector electrodes are also connected to the positive pole of battery $V_2$ and to the negative pole of battery $V_1$, respectively, through resistors $R_4$ and $R_3$. One terminal of DC motor M is connected to the juncture between batteries $V_1$ and $V_2$ and the other input to the collector electrodes of transistors $T_1$ and $T_2$. The emitter electrode of transistor $T_1$ is connected to the negative pole of battery $V_1$ through a resistor $R_1$ and the emitter electrode of transistor $T_2$ is connected to the positive pole of battery $V_2$ via resistor $R_2$.

The direction finder described above operates as follows.

The incoming electromagnetic wave is received by loop antenna L and vertical antenna V and the output of loop antenna L having FIG. 8 shaped directive characteristics is applied to modulator BM together with the output from source OS and is subjected to the balanced modulation to provide an output which is supplied to phase shifting and compounding circuit A. The output signal from non-directional vertical antenna V is phase shifted by 90° by the phase shifting and compounding circuit A and compounded therein with the output from balancing modulator BM to form an out signal of heart shaped directive characteristics. This output signal is then amplified and detected by amplifier-detector circuit B and applied to phase detectors $P_1$ and $P_2$ together with the output from source OS. Phase detectors $P_1$ and $P_2$ operate to produce a positive voltage across resistors 16 and 17 through diodes 12 and 13 when the output supplied to transformer 11 from amplifier-detector circuit B and the output supplied to transformer 18 from source OS have the same phase but to produce a negative voltage when these outputs are of opposite phase. Outputs from phase detectors $P_1$ and $P_2$ are supplied to the emitter electrodes of transistors $T_3$ and $T_4$ via stabilizing circuits $E_1$ and $E_2$, respectively. Transistors $T_3$ and $T_4$ comprise a base grounded amplifier circuit and since transistor $T_3$ is of the NPN type, this transistor becomes conductive only when the output from phase detector $P_1$ is negative. Further, as transistor $T_4$ is of the PNP type, it becomes conductive only when the output from phase detector $P_2$ is positive. Consequently, transistor $T_4$ becomes conductive when the output of amplifier-detector circuit B and the output from modulation source have the same phase, whereas transistor $T_3$ is maintained OFF under these conditions. However, when the outputs from amplifier-detector B and source are of opposite phase, transistor $T_4$ is rendered OFF whereas transistor $T_3$ ON. Upon conduction of transistor $T_3$, a base current is supplied to transistor $T_2$ from phase detector $P_1$ through stabilizing circuit $E_1$ whereby transistor $T_2$ turns on to connect one terminal of motor M to battery $V_2$ through transistor $T_2$ and resistor $R_2$ to rotate antenna L by motor M. Similarly when transistor $T_4$ becomes conductive, transistor $T_1$ is supplied with the base current from phase detector $P_2$ via stabilizing circuit $E_2$ to become conductive thus rotating the motor M and antenna L in the opposite direction by energizing the motor from battery $V_1$ through transistor $T_1$ and resistor $R_1$. In this manner, the antenna is rotated in the forward or reverse direction to bring loop antenna to a direction in which the intensity of the incoming electromagnetic wave is the minimum. During this operation, voltage drops proportional to the currents flowing through the motor are created across resistors $R_1$ and $R_2$ so that circuits including transistors $T_1$ and $T_2$ operate as current feedback type amplifier circuits. Since transistor $T_1$ or $T_2$ conducts current until the voltage drop across resistor $R_2$ becomes substantially equal to that across resistor $R_1$, the motor M is operated by a source of constant current.

In the automatic direction finder described above it is possible to use a small and inexpensive DC motor and since transistors $T_3$ and $T_4$ are of the base grounded type, substantially all of the currents flowing through stabilizing circuits $E_1$ and $E_2$ flow through resistors $R_4$ and $R_3$. When the gains of transistors $T_1$ and $T_2$ exceed a certain limit, currents flowing through transistors $T_1$ and $T_2$ are determined by the currents flowing through transistors $T_4$ and $T_3$ and by resistance ratios $R_3/R_1$ and $R_4/R_2$. In this manner, it is possible to provide stable control of the motor by a circuit employing transistors. Moreover, stabilizing circuits $E_1$ and $E_2$ may be of simple construction employing resistors and capacitors. By providing a pair of DC sources of opposite polarities, forward and reverse rotations of the motor can be effected with simplified circuit constructions requiring only one half the number of power transistors.

Figure 2:
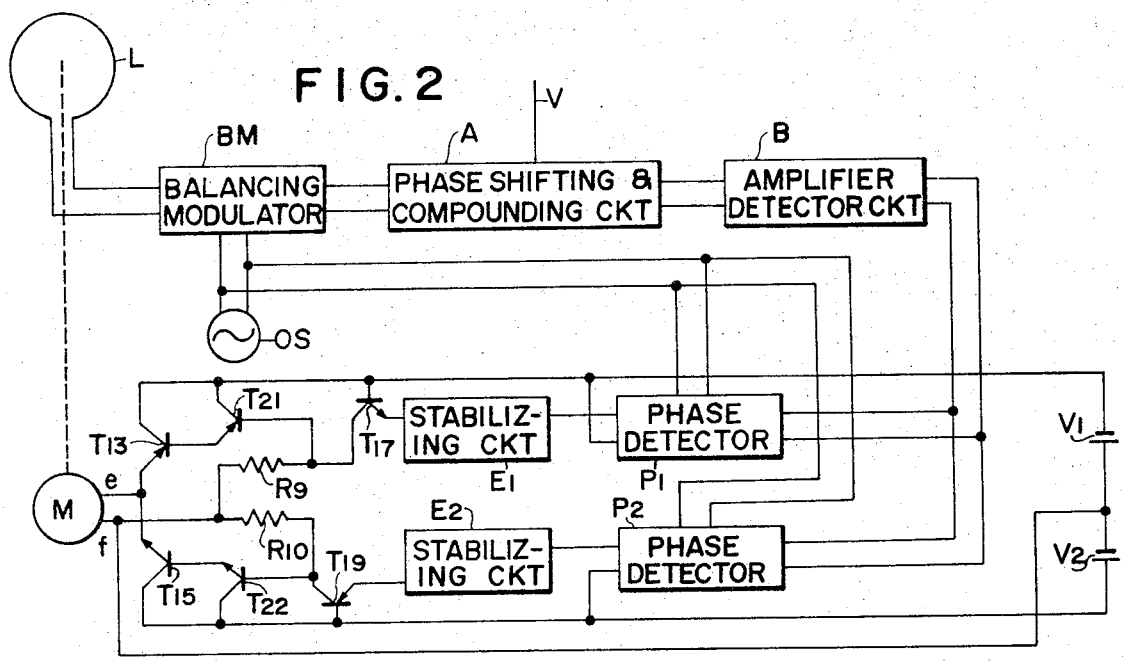
FIG. 2 shows a connection diagram of a modified embodiment of this invention.

FIG. 2 shows a modified embodiment of this invention wherein portions identical to those of FIG. 1 are designated by the same reference numerals for the sake of simplicity. More particularly, phase detectors $P_1$ and $P_2$ are connected to amplifier-detector circuit B and balanced modulation source OS and one of the output terminals of phase detectors $P_1$ and $P_2$ are connected to the negative pole of battery $V_1$ and to the positive pole of battery $V_2$, respectively. The other output of phase detector $P_1$ is connected to the emitter electrode of a NPN type transistor $T_{17}$. The base electrode of transistor $T_{17}$ is connected to the negative pole of battery $V_1$ while its collector electrode is connected to the base electrode of a PNP type transistor $T_{21}$. The collector electrode of transistor $T_{17}$ is also connected to the junction between batteries $V_1$ and $V_2$ via a resistor $R_9$. PNP transistors $T_{21}$ and $T_{13}$ are connected in the Darlington scheme. The emitter electrode of transistor $T_{21}$ is connected to the base electrode of transistor $T_{13}$ while the collector electrode of transistor $T_{21}$ is connected to the negative pole of battery $V_1$. The emitter electrode of transistor $T_{13}$ is connected to a terminal $e$ of DC motor M and the collector electrode is connected to the negative pole of battery $V_1$. The other output terminal of phase detector $P_2$ is connected to the emitter electrode of a PNP type transistor $T_{19}$. The base electrode of transistor $T_{19}$ is connected to the positive pole of battery $V_2$ while its collector electrode is connected to the base electrode of a NPN type transistor $T_{22}$ and to the juncture between batteries $V_1$ and $V_2$ through a resistor $R_{10}$. NPN type transistors $T_{15}$ and $T_{22}$ are also connected in the Darlington scheme. Thus the emitter electrode of transistor $T_{22}$ is connected to the base electrode of transistor $T_{15}$ while the collector electrode of transistor $T_{22}$ is connected to the positive pole of battery $V_2$. The emitter electrode of transistor $T_{15}$ is connected to terminal $e$ of motor M and the collector electrode to the positive pole of battery $V_2$. Another terminal $f$ of motor M is connected to the juncture between batteries $V_1$ and $V_2$.

Similar to the embodiment shown in FIG. 1, phase detectors $P_1$ and $P_2$ of the modified direction finder shown in FIG. 2 generate a positive output when the output of amplifier-detector circuit B and the output of the modulation source OS are of the same phase but generate a negative output when these outputs are of the opposite phase. When phase detectors produce the positive output, current flows through transistor $T_{19}$ via stabilizing circuit $E_2$ to turn ON transistors $T_{15}$ and $T_{22}$ thus energizing motor M to turn loop antenna in the forward direction. On the other hand, when phase detectors $P_1$ and $P_2$ provide the negative output, current flows through transistor $T_{17}$ via stabilizing circuit $E_1$ to turn ON transistors $T_{13}$ and $T_{21}$ thus turning the motor and loop antenna in the opposite direction.

Thus, in accordance with this invention it is possible to use a small and inexpensive DC motor and simplified stabilizing circuit.

It is to be understood that the invention is not limited to the illustrated embodiments and that many changes and modifications will occur to one skilled in the art without departing from the true spirit and scope of the invention as defined in the appended claims.

What is claimed is:

1. An automatic direction finder comprising a loop antenna and a vertical antenna for receiving incoming electromagnetic waves, circuit means for effecting a balanced modulation of one of the output signals from said loop antenna and said vertical antenna with a given modulation frequency, for phase shifting the other of said output signals by 90° and for combining the modulated signal with said shifted output signal, a detector circuit for detecting the output signal from said circuit means, a phase detector circuit to effect phase detection of the output signal from said detector circuit in accordance with said modulation frequency; a DC motor for rotating said loop antenna, a DC source having a mid-point connected to one terminal of said motor, a pair of control transistors respectively connected between the other terminal of said motor and opposite poles of said DC source, and a pair of transistors controlling the ON and OFF operations of said control transistors in accordance with the output of said phase detector circuit wherein said phase detector circuit comprises a pair of similar phase detectors each comprising a first transformer having a primary winding energized by the output of said detector circuit, a pair of resistors connected in series across the secondary winding of said first transformer through a pair of diodes, a pair of capacitors connected in series across said serially connected resistors, a second transformer having a primary winding energized by said modulation frequency and a secondary winding connected between the mid-point of said secondary winding of said first transformer and junctures between said resistors and said capacitors and wherein outputs from said phase detectors are coupled to emitter electrodes of said last mentioned pair of transistors respectively through stabilizing circuits.

2. The automatic direction finder according to claim 1 wherein each of said stabilizing circuits includes a parallel connected resistor and capacitor.

* * * * *

UNITED STATES PATENT OFFICE
CERTIFICATE OF CORRECTION

Patent No. 3,761,931　　　　　　　　　　Dated　　September 25, 1973

Inventor(s) Chosaku Hisatsu

It is certified that error appears in the above-identified patent and that said Letters Patent are hereby corrected as shown below:

Column 2, line 55, before "modulator" insert -- balancing --.

Signed and sealed this 17th day of September 1974.

(SEAL)
Attest:

McCOY M. GIBSON, JR.　　　　　　　C. MARSHALL DANN
Attesting Officer　　　　　　　　　Commissioner of Patents